United States Patent
Juengst et al.

(10) Patent No.: US 7,327,542 B2
(45) Date of Patent: Feb. 5, 2008

(54) CURRENT LIMITER FOR LIMITING CURRENT IN CASE OF A FAULT

(75) Inventors: Klaus-Peter Juengst, Stutensee (DE); Mathias Noe, Schauenburg (DE); Grigory Kuperman, Karlsruhe (DE)

(73) Assignee: Forschungazentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 11/711,185

(22) Filed: Feb. 26, 2007

(65) Prior Publication Data
US 2007/0253131 A1  Nov. 1, 2007

Related U.S. Application Data

(63) Continuation-in-part of application No. PCT/EP2005/010850, filed on Oct. 8, 2005.

(30) Foreign Application Priority Data

Dec. 4, 2004  (DE) ............... 10 2004 058 633

(51) Int. Cl.
 *H02H 9/00* (2006.01)
 *H01F 36/00* (2006.01)
 *H01F 17/00* (2006.01)

(52) U.S. Cl. ............... 361/58; 323/360; 323/363

(58) Field of Classification Search ............ 361/58
See application file for complete search history.

(56) References Cited

U.S. PATENT DOCUMENTS 4,438,474 A * 3/1984 Paice .................. 361/58
6,654,222 B2 * 11/2003 Jungst et al. ............ 361/93.9

FOREIGN PATENT DOCUMENTS

| DE | 100 03 556 | 8/2000 |
| JP | 01 023721 | 1/1989 |
| WO | WO 03/044922 | 5/2003 |

* cited by examiner

Primary Examiner—Michael Sherry
Assistant Examiner—Dharti H Patel
(74) Attorney, Agent, or Firm—Klaus J. Bach

(57) ABSTRACT

In a current limiter for limiting currents in case of a fault including an additional device comprising an additional electric valve connected in series and being conductive in the same direction as the associated main valve, two series-connected valve branches arranged in opposition bypass two series connected current limiting inductors and both additional valves are bypassed by a similar passively complex connection for limiting current in the case of a fault, wherein the current limiter is not noticeable during normal operation, but, in the event of a fault, effectively limits the short circuit to a predetermined extent.

7 Claims, 1 Drawing Sheet

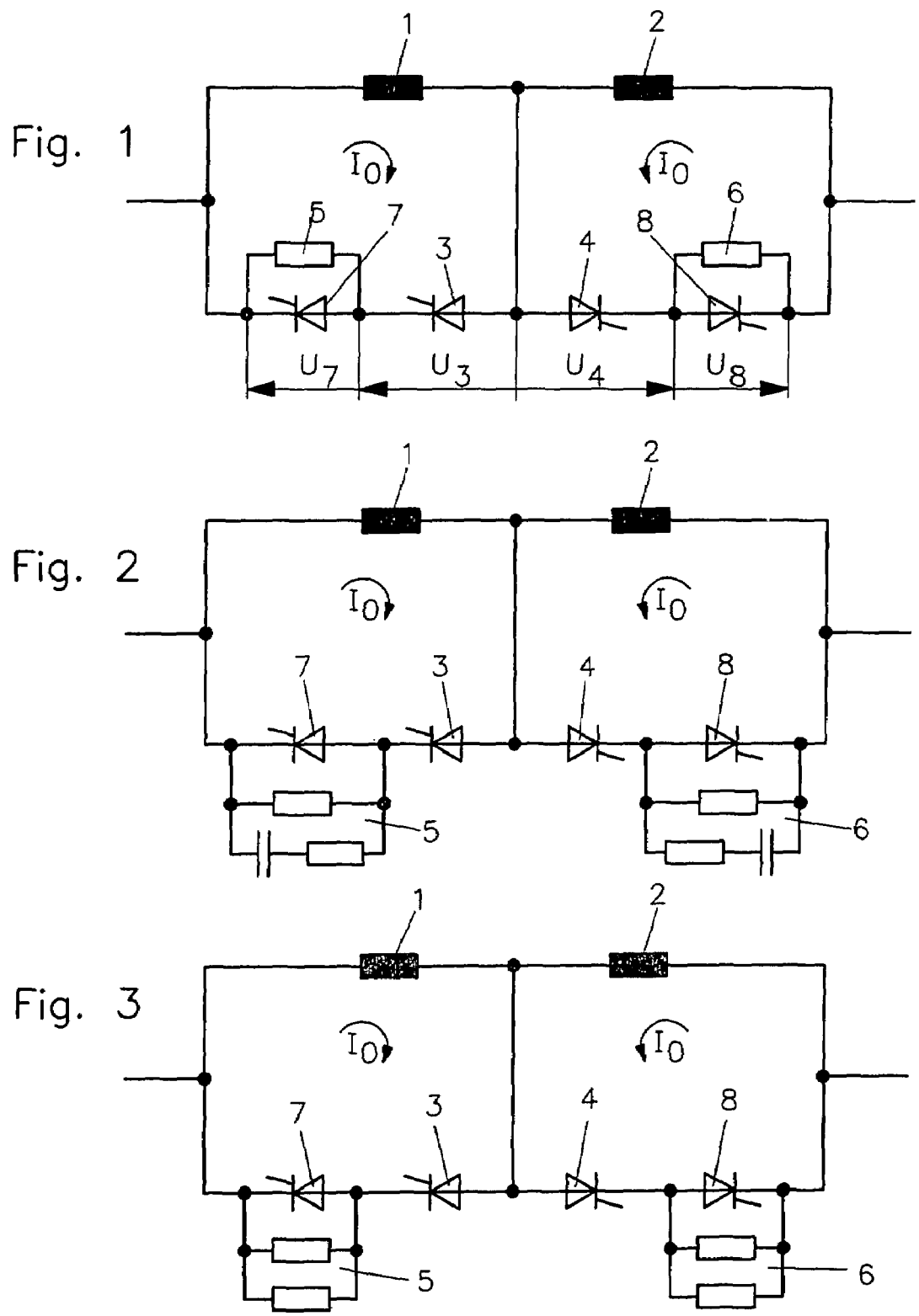

CURRENT LIMITER FOR LIMITING CURRENT IN CASE OF A FAULT

This is a Continuation-In-Part Application of international patent application PCT/EP2005/010850 filed Oct. 8, 2005 and claiming the priority of German application 10 2004 058 633.0 filed Dec. 4, 2004.

BACKGROUND OF THE INVENTION

The invention relates to a current limiter for limiting current in case of a fault including two similar serially arranged inductivities or throttles and two similar controlled electric valves which are arranged in opposition to each other and parallel to the two inductivities.

A current limiter with controlled valves is known for example from DE 100 03 556. It comprises two serially arranged inductivities or throttles and two controlled electric valves which are arranged in opposition to each other in parallel with the two inductivities. In the known current limiter, the common potential point and the common potential point of the two inductivities are interconnected but not necessarily directly.

The current limiter is installed in the power current circuit of an apparatus. As explained in DE 100 03 556 in detail, it forms for the normal or nominal operation at most a negligible ohmic resistance. Only if a short circuit occurs in the apparatus to be served, that is, when a current threshold is exceeded, first one of the two valves and subsequently, the second valve are switched from a conductive state to a blocking state whereby an additional resistance is provided in the supply circuit of the apparatus for limiting the current.

The current limiter operates as follows: When the current circuit is switched on, after reaching the stationary stage, a circuit DC current $I_0$ flows in each of the two circuits consisting of inductivity and bridged valve as a result of the effective component parameters. In the stationary nominal operation, the two inductivities present no resistance to alternating current since no time variable current is flowing. The two values are similar controlled valves which, when the power circuit is switched on, become actively conductive via the respective control electrode; with a possibly necessary voltage resistance, they consist each of a cascade of similar elementary valves.

The activation of the Fault Current Limiter, FCL, is indicated in case of a short circuit by the occurrence of an ohmic resistance, an inductivity or a combination of the two of a suitable level, whereby the short circuit current in the apparatus current circuit is limited. Up to nominal operation, the current limiter is not noticeable.

Upon occurrence of a fault/short circuit, when a predetermined fault current threshold is exceeded and upon first reaching the minimum duration for the restitution of the electrical strength for the presence of a voltage opposite to the passing direction at the respective valve, the valve becomes automatically non-conductive and remains non-conductive. This also occurs at the other then still conductive valve so that the two inductivities are finally arranged in a series circuit and act as an additional alternating current resistor in the electric circuit whereby the current or short circuit current remains within limits. For limiting the current in energy engineering heated reactors and superconductive throttles are used.

Particularly suitable for that purpose are superconductors since they have only a small voltage drop in normal operation and the transition to normal conductivity results in the elimination of a high electric resistance and causes the passing of magnetic fluxes. This can be utilized for a resistive or, respectively, inductive current limiter functions (Prof. Dr. Tech. P. Komarek, "High Voltage Application of the Superconductivity" (1995). In alternating current operation a superconductive wire is not without losses, but there are always two basis loss mechanisms in effect, that is, the eddy current losses in the matrix and the re-magnetization losses (hysteresis losses) in the hard superconductor. With DC current operation, the losses in a superconductive wire are practically zero.

In Boenig, H. J. and D. A. Paice, 1983, Fault Current Limiter using a Superconducting Coil, IEEE, Transactions on Magnetics, Vol. 19, No. 3, page 1051, May, a current limiter is disclosed whose superconductive throttle is switched on the DC current side by rectifiers. A voltage source is arranged at the DC current side in series with the throttle. The voltage source ensures that a current $I_0$ flows through the throttle. The amount of the current $I_0$ exceeds the amplitude of the AC current which flows through the limiter. As long as there is no fault, it is substantially lower than the short circuit current. The bridge then also permits the load current to pass. Herein, the voltage drop across the limiter equals the voltage drop across the valves in the two shoulders of the bridge.

FR-No. 1 337 971 discloses an electric control circuit, which comprises a load which is connected to an electric energy source via a protective circuit. The protective circuit limits the current changes in order to mitigate a sudden current change in the load. The protective circuit comprises two inductivities which are arranged in series and which are bridged by two uncontrolled valves or diodes arranged in series. The diodes have opposite low resistance directions. The common points of the diodes and the inductivities are directly interconnected. The uncontrolled valves block only currents which are greater than the operating current of the protective arrangement which corresponds to the operating current of the inductivities, and conduct the high current components via the inductivities almost without resistance (diode resistance in low resistance direction). The current flowing in the inductivities cannot follow the supply current which drops again after the current maximum since it is short circuited by the diodes and, in the process, remains essentially at the given value.

The consideration of each respective next half wave is divided into a consideration of currents below the operating current and those above. Smaller currents flow via the conductive diode whereas the higher currents flow via the conductive diode whereas the higher currents flow via the inductivities and increase the current flowing this way already. This process is repeated with each half wave for the respective effective part of the circuit. During a short circuit, this results in an essential increase of the current in the inductivities and in the outer current circuits during the minimum time interval which is needed for switching the arrangement off (100-150 msec.) and particularly during the time interval (1-2 secs) which is needed for securing the selective operation of the protective devices.

By the use of active semi-controlled valves such as thyristors in a bridge circuit, a more effective limitation of the short circuit current is achieved. As a result, a power output control is obtained which, during a fault, controls the current flowing through the coil down to zero (Boenig, H. J. and D. A. Paice, 1983, Fault Current Circuit Limiter using a superconducting Coil, IEEE Transactions on Magnetics, Vol. 19, No. 3, page 1051, May; FR-Nr. 1 337 971). However, in this case, a special apparatus is needed which identifies a short circuit and changes the control algorithm for the thyristor in the bridge, that is, in this case, it is not a current limiter which operates safely with passive triggering. In this case, the current limiter is therefore not an element that can be passively triggered. It rather requires a special control unit for the thyristor. This greatly reduces the reliability of the current limiter.

In case of a fault, when the amplitude of the alternating current exceeds the value $I_0$ in the throttle, the short circuit current is limited by the inductivity of the throttle. The limit for the short circuit current is determined by the maximum energy which is stored in the throttle during the transient process:

$$W_{max} = L \cdot I_{max}^2 / 2$$

Optimization of the current limiter means minimizing the energy ($W_{max}$) stored in the throttle.

In a current limiter as described in DE 100 03 556, the valves of the current limiter trigger themselves spontaneously during a fault, when a predetermined high current above nominal current is exceeded, that is, they act passively. They switch from a conductive state to a blocking state and remain in the blocking state. The two inductivities L act during the fault occurrence as additional alternating current resistor $2\omega L$ in the current circuit whereby, with a corresponding dimensioning thereof, the short circuit current is limited for compatibility with and protection of the apparatus.

The current limiter described in DE 100 03 556 is provided for the rare fault occurrence of a short circuit in an apparatus in which it is installed. The fault remains under control as long as the two valves are operational. The protective function of the two valves is very important for the respective apparatus. The very rare fault occurrence of failure or breakdown of a valve or of both valves would be catastrophic since there would no longer be an effective current limit during a short circuit. The attrition of the electric energy present in the electric circuit would find no resistance, would occur instantly and result in a destructive energy change in a very short time at least until finally supervisory protection systems are activated and effectively put in place.

It is therefore the object of the present invention to provide the known current limiter for limiting an apparatus current during a fault occurrence with a passively effective, spontaneously reacting protective arrangement which limits a short circuit current during a failure or breakdown of one or both valves right from the beginning of such a failure at least for such a time until the apparatus or the network can be fully shutdown by way of the available protection equipment so that no additional damage will occur.

SUMMARY OF THE INVENTION

In a current limiter for limiting currents in case of a fault including an additional device comprising an additional electric valve connected in series and being conductive in the same direction as the associated main valve, two series connected valve branches arranged in opposition bypass two series connected current limiting inductors and both additional valves are bypassed by a similar passively complex connection for limiting current in the case of a fault, wherein the current limiter is not noticeable during normal operation, but, in the event of a fault, effectively limits the short circuit to a predetermined extent.

The additional protection equipment comprises the following components:

In addition to the two valves 3 and 4, which are the main valves, which are semi-controlled, for example, thyristors and transistors, in each case one additional electric valve 7, or respectively, 8, in the form of an auxiliary valve is arranged in series with the semi-controlled valves with a low resistance in the same direction. These two valve branches, one in series with the main valve 3 and the additional valve 7 and the other in series with the main valve 4 and the additional valve 8, are electrically connected at their common potential point directly or indirectly (see DE 100 03 556) with the common potential point of the two inductivities. As seen from the common potential point of the two valve branches, the additional valve 7 or, respectively, 8 can follow the main valve 3 or, respectively, 4 or vice versa.

The two additional valves 7 and 8 are bridged each by an identical passive complex circuit structure 5, and, respectively, 6, which has no function during normal operation nor during a fault condition such as a short circuit in the respective apparatus connected in the circuit. Only in the very rare fault occurrence which involves a short circuit in the apparatus and/or the failure or breakdown of one or both main valves, the passive, complex circuitry of the respective additional valve or valves becomes activated to limit the short circuit during the transition of the additional valve or the two additional valves into a blocking state with the first zero passage after exceeding the fault current threshold. This occurs automatically, that is, spontaneously and passively. During the following zero passage full blockage occurs also in the other valve branch.

Generally, with the passive complex circuits 5, or respectively, 6, the voltage $U_7$ or, respectively, $U_8$ can be measured at the respective additional valve 7 and, respectively, 8. In the passive complex circuitry, during a fault occurrence, the voltage $U_{7max}$ occurs at the respective additional valve 7, or, respectively, 8. The passive complex circuitry 5 and 8 is in each case so designed that, during fault-free operation of the current limiter, the maximum voltage $U_{7max}$ and respectively, $U_{8max}$ across the additional valve 7 and, respectively, 8 is below the voltage $U_{3max}$ or, respectively, $U_{4max}$ across the main valve 3 or respectively 4, or a selectable voltage $U_v$, and during a short circuit fault in the main valve 3 or 4 or in both the voltage $U_{7max}$ or $U_{8max}$ or both are above the voltage $0.5 \ U_{3max}$ or $0.5 \ U_{4max}$ at the main valve 3 or 4 or above the selectable voltage $U_{v2}$ with which they are to be compared. Here, the protection function of this additional equipment becomes apparent whereby the effect of the very rare fault occurrence of a sudden failing of both main valves is limited from the start of its occurrence. For the understandable reason of the independence, the adapted voltage $kU_7$ or, respectively, $kU_8$-k is a factor <1 (voltage division) is compared via the additional valve 7, or respectively, 8, preferably with a reference voltage $U_{ref}$, in order to have, by an electronic jointure, an adjustable form relationship for forming a signal for the fault recognition in the current limiter. However, mainly damage to the valves 7 and 8 by the voltage applied is to be prevented. In the normal or nominal operation for example, a setup and arrangement/dimensioning of the complex network is established as follows:

No fault is present as long as:

$$kU_{7max} < k0.5 U_{3max}(kU_{v1}) = U_{ref}, \text{ and}$$

$$kU_{8max} < k0.5 U_{8max}(kU_{v1}) = U_{ref};$$

fault recognition in the current limiter, eventually if:

$$kU_{7max}, kU_{8max} > kU_{v2} = U_{ref}.$$

For technical safety reasons, a voltage difference is maintained and therefore the voltage equality is not used.

Generally, the components and networks are considered to be circuit components.

Preferably, the two additional valves 7 and 8 are uncontrolled valves, that is, diodes or semi-controlled valves, that is, thyristors or fully controlled valves, that is, transistors.

The respective circuitry over the additional valves is generally complex. It may be a special case if it includes only one real part. This is a problem with respect to oscillation with only ohmic resistors. Reactive compensation, in the simplest case $j\omega L + 1/j\omega C = 0$, is frequency-based and should be avoided because of the frequency compositions of impact processes, since generation of an oscillation is unavoidable in this connection. The passive complex circuitry may be an R-C network, that is, it may consist of at least one condenser C and at least one ohmic resistor R. It may be an R-L network.

The voltage resistance and the circuit carrying capability of the current limiter with the additional current limiting and protection arrangement are taken into consideration, if the two main valves 3 and 4 and the two additional valves 7 and 8 are adapted to the desired voltage resistance and are arranged in a series circuit and include a parallel arrangement of at least one group specific elementary valve adapted to the voltage carrying capacity. In case the additional valve consists of at least two basic valves arranged in series, each basic valve, or in the case of parallel arrangements, each basic additional valve row, is provided with the same passive complex basic circuitry. The passive complex circuitry then comprises all the associated basic circuitries, which must be considered for the dimensioning on an apparatus-by-apparatus basis.

Based on the electric resistance, the additional circuitry is not noticeable up to nominal operation. During the rare occurrence of a short circuit in the apparatus, the properly working valves cause the introduction of a resistance in order to limit the current. In the very rare occurrence of an apparatus short circuit and at least one inoperative or failed main valve, the associated additional valve takes over the introduction of the effective current limitation. With the additional equipment for limiting the current the following is achieved:
- a spontaneous effective limitation of the current when a short circuit occurs in the electric power supply system or a valve breaks down,
- a smaller volume dimensioning of the components of the power supply system,
- a secure selectivity of the response of the protection equipment during a short circuit in the power supply system and during a valve break down, and
- the fault recognition in the valves.

Consequently, the fault consequences during a valve break-down in the actual current limiter (according to DE 100 03 556) are minimized.

Below, an exemplary embodiment of the invention will be described on the basis of the accompanying drawings.

BRIEF DESCRIPTION OF THE DRAWINGS

FIG. 1 shows the current limiter with a resistance circuitry at the additional valve, FIG. 2 shows the current limiter with R-C circuitry at the additional valve, and FIG. 3 shows the current limiter with a R-L circuitry at the additional valve.

DESCRIPTION OF A PARTICULAR EMBODIMENT

In the embodiment shown, as valves of the current limiter thyristors are used for the main valves 3 and 4 and also for the additional valves 7 and 8. All valves 3, 4, 7, 8 are semi-controlled valves. All valves 3, 4, 7, 8 are designed for the maximum current and the maximum voltage occurring during a short circuit in the electric power supply system.

When the arrangement is placed into operation, the thyristors 3, 7 and 4, 8 are ignited and the current flowing through the throttles 1 and 2 increases up to the (constant or DC) current $I_0$ whose valve exceeds the amplitude of the AC current $I_{max}$ which flows through the limiter during normal operation and which is smaller than a short circuit current. As long as no faults occur in the circuit which is protected by the current limiter, in the additional protective circuitry, the current through the valve 7 equals the current flowing through the valve 3 and, accordingly, the current flow through the valve 8 equals the current flow through the valve 4. When the current in the throttles 1 and 2 increases up to $I_0$ the current flow through the thyristors 3, 7 and 4, 8 changes under normal operation during a period of the AC current in accordance with the following equations:

$$I_{3,7} = I_0 + I_{max} \sin(\omega t + \phi_0);$$

$$I_{4,8} = I_0 - I_{max} \sin(\omega t + \phi_0);$$

At the same time, the current flow through the throttles remains unchanged $I_0$. Upon occurrence of a short circuit first one of the two pairs of thyristors, for example, the thyristors 3 and 7, become non-conductive, that is, blocking since the voltage at the resistors 3 and 7 is reversed. During the period in which a reversal voltage is applied to the thyristors 3, 4, which period is equal to or greater than the time for the restitution of the electrical rigidity of the thyristors, the thyristors remain in that state. Otherwise, a similar situation occurs in the thyristors 4, 8. Then the current in the throttle 2 increases and exceeds the value $I_0$. In such a short circuit situation at the valves 3 and 4 or, respectively, 4 and 8 which are arranged in series, a voltage $U_3 + U_7$ or, respectively, $U_4 + U_8$ occurs with a polarity opposite to their passage direction. This voltage is divided between the mentioned thyristors 3, 4 and the respective valves 7, 8 in the additional protective circuitry. The passive complex circuitries 5 and 6, called snubbers are so selected that the voltage across the valves 7, 8 ($U_7$, $U_8$) is essentially smaller than the voltage across the valves 3, 4 ($U_3$, $U_4$), for example $U_7 < 0.3\ U_3$ and $U_8 < 0.3\ U_4$. As a result, damage to the valves 7, 8 by the voltage applied thereto is excluded. The voltages $U_3$, $U_4$ and particularly $U_7$, $U_8$ are, in accordance with well-known treatment, analog or possibly digitally transformed for the surveillance and initialization of the protective hierarchies already present.

In case the valve 3, or respectively, 4 are damaged, the full voltage is applied to the valve 7, or, respectively, 8 of the associated additional equipment and the short circuit is limited by the throttle 1, 2 and the two passive complex circuitries. The current flowing through the snubbers 5, 6 represents only an insignificant part of the short circuit current, about 1 to 3%. The energy stored in, or respectively released from, the two snubbers 5 and 6 is also only an insignificant part of the energy stored in the inductivities 1 and 2, <2%.

The operation of the current limiter is determined by the parameters of the throttles 1, 2 and the valves 7, 8. With semi-controlled valves 7 and respectively, 8, that is, thyristors, the short-circuit in the valves 3, 4 is not substantially different from the current occurring during normal operation of the current limiter even with the occurrence of a breakdown.

What is claimed is:

1. A current limiter for limiting current in case of a fault, comprising two similar inductivities/throttles (1, 2) arranged in series, two similar controlled electric valves (3, 4) arranged in series in opposition to each other and in parallel with the inductivities (1, 2) so as to bridge the inductivities, additional electrical valves (7, 8) arranged each in series with one of the two controlled electric valves (3, 4) and being conductive in the same direction as the associated controlled electric valves (3, 4), so as to form valve branches having a common potential point connected to a common potential point of the two inductivities (1, 2), a passive complex circuitry (5, 6) arranged in parallel with the respective additional electrical valves (7, 8) for limiting current in case of a fault and for determining a voltage $U_7$ and, respectively, $U_8$ across the respective additional valves (7, 8), the passive complex electrical circuitry (5, 6) being so designed that, during fault-free operation of the current limiter, the maximum voltage $U_{7max}$ and, respectively, $U_{8max}$ across the additional valve (7) and, respectively, (8) is below the maximum voltage $U_{3max}$ and, respectively, $U_{4max}$ across the controlled electric valves (3) and, upon occurrence of a fault, that is a short circuit/breakdown of at least one of the controlled electric valves (3, 4), the voltage $U_{7max}$ or $U_{8max}$ is above the comparative voltage 0.5 $U_{3max}$ or 0.5 $U_{4max}$ or a predetermined voltage $U_{v2}$.

2. The current limiter according to claim 1, wherein the two additional valves (7) and (8) are uncontrolled valves (diodes).

3. The current limiter according to claim 1, wherein the two additional valves (7) and (8) are controlled valves including thyristors (semi-controlled valves) and transistors (fully controlled valves).

4. The current limiter according to claim 1, wherein the passive complex circuitry (5, 6) consists of resistive components.

5. The current limiter according to claim 1, wherein the passive complex circuitry (5, 6) comprises an R-C network.

6. The current limiter according to claim 1, wherein the passive complex circuitry (5, 6) comprises an R-L network.

7. The current limiter according to claim 1, wherein the two controlled electric valves (3, 4) and the two additional valves (7, 8) comprise, adapted to the desired voltage resistance, a series arrangement with at least one group-specific elementary valve, and, adapted to the current carrying capability, a parallel arrangement with at least one group-specific elementary valve, the associated passive complex circuitry (5, 6) at the respective additional valves (7, 8) consisting of similar passive complex elementary circuitry of which each bridges one stage of the serially arranged additional elementary valves (7, 8).

\* \* \* \* \*